(12) United States Patent
Yonekubo et al.

(10) Patent No.: US 11,624,920 B2
(45) Date of Patent: Apr. 11, 2023

(54) DISPLAY MODULE AND DISPLAY DEVICE

(71) Applicant: SEIKO EPSON CORPORATION, Tokyo (JP)

(72) Inventors: Masatoshi Yonekubo, Nagano-ken (JP); Mitsutaka Ide, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 282 days.

(21) Appl. No.: 17/161,672

(22) Filed: Jan. 29, 2021

(65) Prior Publication Data
US 2021/0239986 A1    Aug. 5, 2021

(30) Foreign Application Priority Data

Jan. 31, 2020    (JP) .............................. JP2020-014620

(51) Int. Cl.
*G02B 27/01*    (2006.01)
*G03H 1/02*    (2006.01)

(52) U.S. Cl.
CPC ....... *G02B 27/0172* (2013.01); *G03H 1/0248* (2013.01); *G02B 2027/011* (2013.01); *G02B 2027/0112* (2013.01); *G02B 2027/0174* (2013.01); *G02B 2027/0178* (2013.01)

(58) Field of Classification Search
CPC .......... G02B 27/0172; G02B 2027/011; G02B 2027/0112; G02B 2027/0174; G02B 2027/0178; G03H 1/0248

USPC .......................................................... 359/13
See application file for complete search history.

(56) References Cited

U.S. PATENT DOCUMENTS

| | | | |
|---|---|---|---|
| 2015/0277117 A1 | 10/2015 | Yamada et al. | |
| 2019/0235266 A1 | 8/2019 | Ide et al. | |
| 2019/0265494 A1* | 8/2019 | Takagi | ................. G02B 17/086 |

FOREIGN PATENT DOCUMENTS

| | | |
|---|---|---|
| JP | 2000-056259 | 2/2000 |
| JP | 2015053163 | 3/2015 |
| JP | 2015-194551 | 11/2015 |
| JP | 2019-133132 | 8/2019 |

\* cited by examiner

*Primary Examiner* — Collin X Beatty
(74) *Attorney, Agent, or Firm* — JCIPRNET (57) ABSTRACT

A display module includes an image light generation device configured to generate image light, a first diffraction element including a first surface and a second surface and configured to diffract the image light, a first reflection section configured to reflect the image light, and a second diffraction element including a third surface and configured to diffract the image light. The first diffraction element is configured to transmit the image light incident on the first surface and emit the image light toward the first reflection section, the first reflection section is configured to reflect the image light toward the second surface, the first diffraction element is configured to diffract the image light incident on the second surface and emit the image light toward the second diffraction element, and the second diffraction element is configured to diffract the image light, emit the image light, and form an exit pupil.

8 Claims, 7 Drawing Sheets

DISPLAY MODULE AND DISPLAY DEVICE

The present application is based on, and claims priority from JP Application Serial Number 2020-014620, filed Jan. 31, 2020, the disclosure of which is hereby incorporated by reference herein in its entirety.

BACKGROUND

1. Technical Field

The present disclosure relates to a display module and a display device.

2. Related Art

A head-mounted display apparatus configured to guide image light to an eye of an observer while using a plurality of reflection surfaces to reflect the image light is known. JP-A-2019-133132 discloses a display apparatus of a head-mounted type including a first optical unit having positive power, a second optical unit including a first diffraction element and having positive power, a third optical unit having positive power, and a fourth optical unit including a second diffraction element and having positive power. In this display apparatus, a first intermediate image of image light is formed between the first optical unit and the third optical unit, a pupil is formed between the second optical unit and the fourth optical unit, a second intermediate image of the image light is formed between the third optical unit and the fourth optical unit, and an exit pupil is formed on a side of the fourth optical unit opposite to the third optical unit.

In the display apparatus of JP-A-2019-133132, each of the optical members is disposed so that a positional relationship between the optical members satisfies specific conditions, ensuring compensation for wavelength dispersion by the two diffraction elements. Therefore, numerous spaces for arranging the optical members are required, and the display apparatus may become large in size.

SUMMARY

To solve the problems described above, a display module according to one aspect of the present disclosure includes an image light generation device configured to generate image light, a first diffraction element including a first surface and a second surface and configured to diffract the image light, a first reflection section configured to reflect the image light, and a second diffraction element including a third surface and configured to diffract the image light. The first diffraction element is configured to transmit the image light incident on the first surface from the image light generation device and emit the image light from the second surface toward the first reflection section, the first reflection section is configured to reflect the image light emitted from the first diffraction element toward the second surface of the first diffraction element, the first diffraction element is configured to diffract the image light incident on the second surface from the first reflection section and emit the image light from the second surface toward the second diffraction element, and the second diffraction element is configured to diffract the image light incident on the third surface from the first diffraction element, emit the image light from the third surface, and form an exit pupil.

A display device according to one aspect of the present disclosure includes the display module according to an aspect of the present disclosure and a housing configured to accommodate the display module.

DESCRIPTION OF EXEMPLARY EMBODIMENTS

First Exemplary Embodiment

A first exemplary embodiment according to the present disclosure will be described below with reference to FIG. 1 to FIG. 9.

Figure 1:
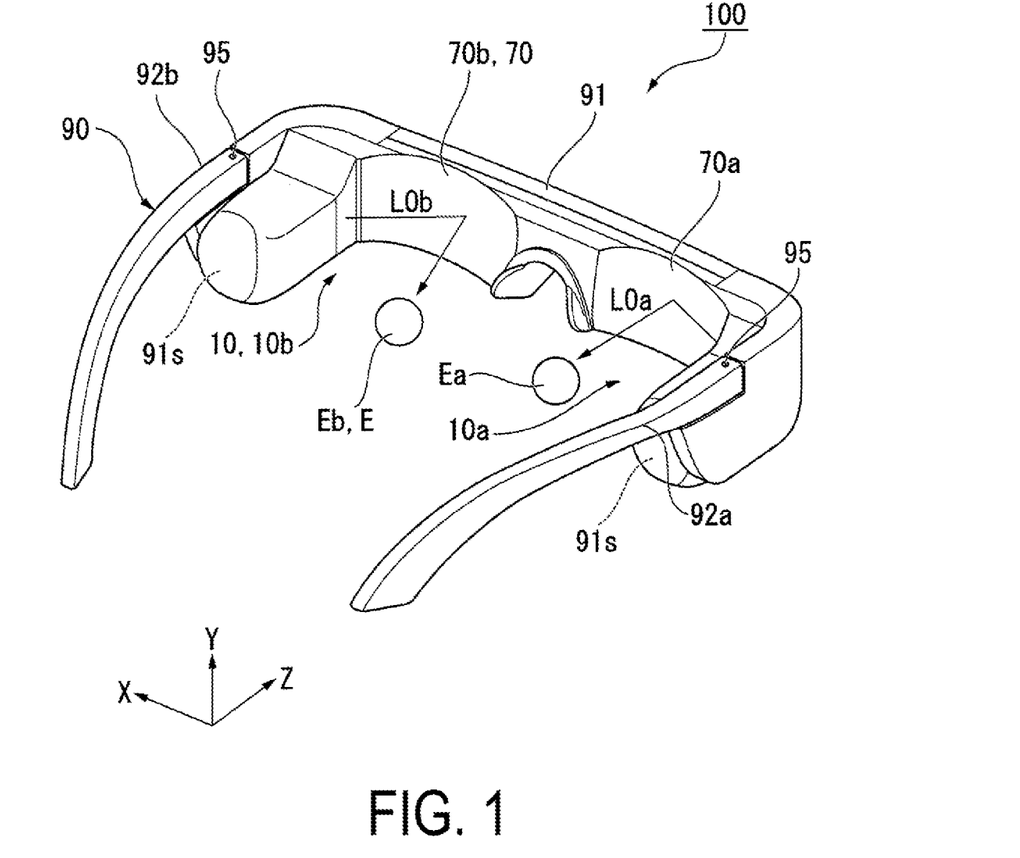
FIG. 1 is a perspective view of a display device according to a first exemplary embodiment.
Figure 2:
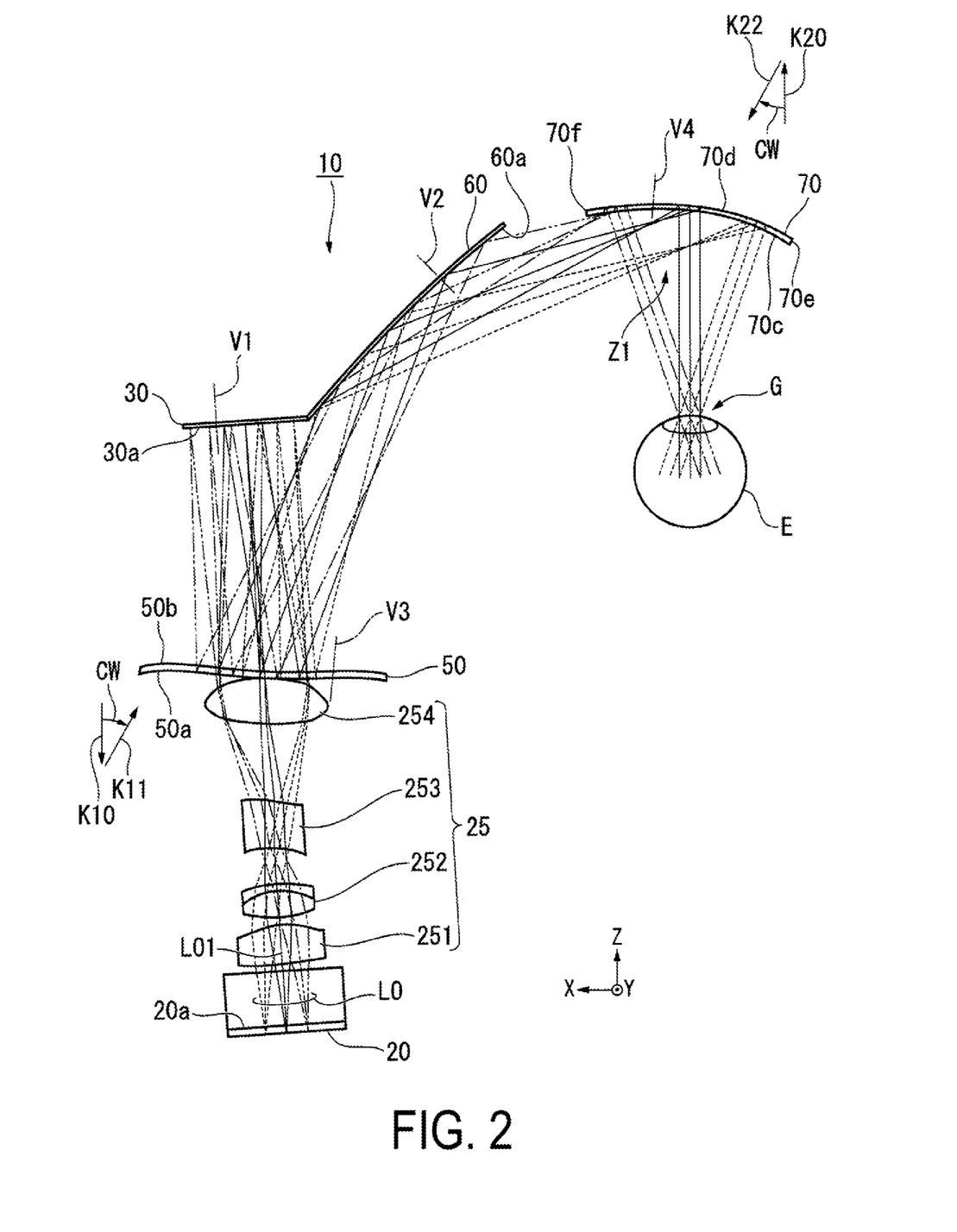
FIG. 2 is a plan view illustrating a configuration of a display module according to the first exemplary embodiment.
Figure 3:
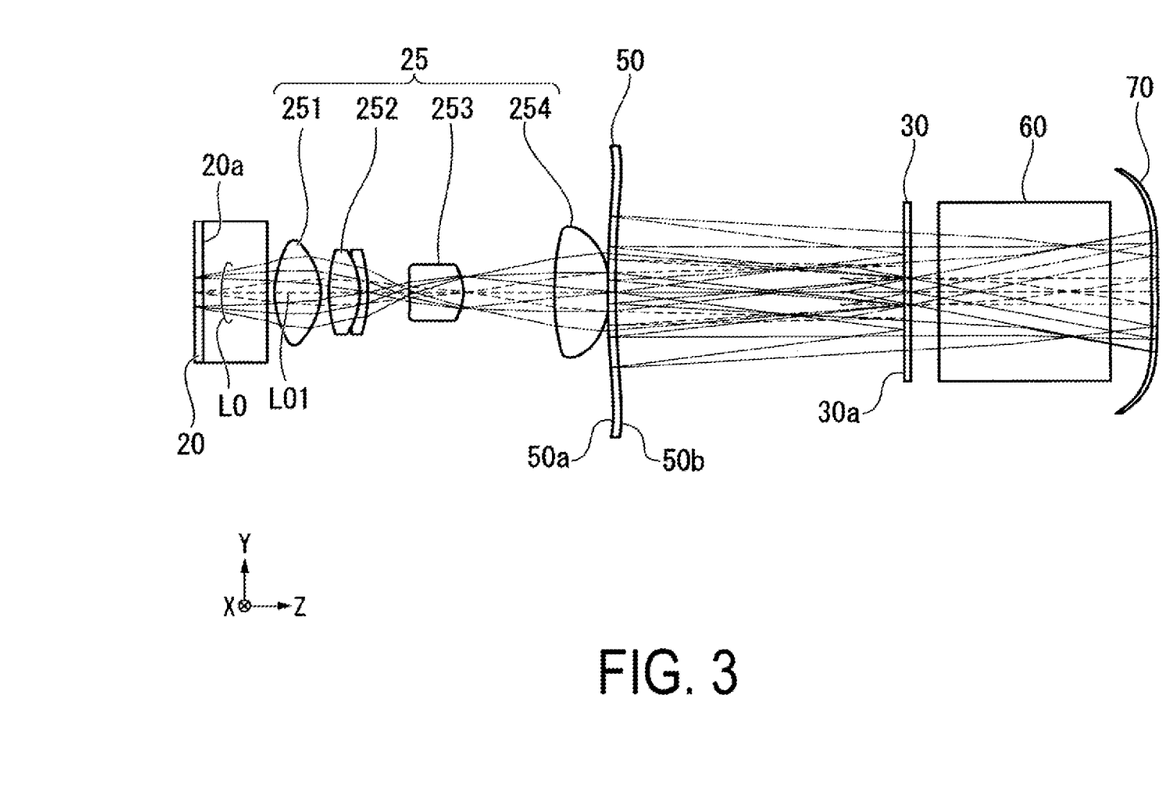
FIG. 3 is a side view illustrating the configuration of the display module according to the first exemplary embodiment.

FIG. 1 is a perspective view illustrating a head-mounted display apparatus of this exemplary embodiment. FIG. 2 is a plan view illustrating a schematic configuration of a display module of the head-mounted display apparatus. FIG. 3 is a side view illustrating a schematic configuration of the display module.

In the following description, the head-mounted display apparatus is simply referred to as a display device. Further, in the drawings, the dimensions of some components may be scaled differently for ease of understanding of the components.

In the drawings, based on a front-rear direction, a left-right direction, and an up-down direction when a display device 100 is mounted onto a head of an observer, the following directions are defined. An axis in the up-down direction is a Y-axis, a direction upward from below is a +Y direction, and a direction downward from above is a −Y direction. An axis in the front-rear direction is a Z-axis, a direction frontward from the rear is a +Z direction, and a direction rearward from the front is a −Z direction. An axis in the left-right direction is an X-axis, a direction leftward from the right is a +X direction, and a direction rightward from the left is a −X direction. The Y-axis, the Z-axis, and the X-axis are orthogonal to each other.

When the directions described above are defined using the components of the display device 100, an axis connecting a center of a second diffraction element 70a of a right-eye display module 10a and a center of a second diffraction element 70b of a left-eye display module 10b is the X-axis, a direction from the second diffraction element 70a toward the second diffraction element 70b is the +X direction, and a direction from the second diffraction element 70b toward the second diffraction element 70a is the −X direction. In a display module 10 described later, an optical axis of an exit pupil is the Z-axis, a direction from the exit pupil toward the second diffraction element 70a or the second diffraction element 70b is the +Z direction, and a direction from the second diffraction element 70a or the second diffraction element 70b toward the exit pupil is the −Z direction. An axis in a vertical direction of a display surface of an image light generation device 20 is the Y-axis, a direction upward from below the display surface is the +Y direction, and a direction downward from above the display surface is the −Y direction.

As illustrated in FIG. 1, the display device 100 includes the right-eye display module 10a configured to cause image light L0a to be incident on a right eye Ea, the left-eye display module 10b configured to cause image light L0b to be incident on a left eye Eb, and a housing 90 configured to accommodate the right-eye display module 10a and the left-eye display module 10b. The display device 100 has, for example, an eyeglasses-like shape. The display device 100 is mounted onto the head of the observer by the housing 90.

The housing 90 includes a frame 91, a temple 92a provided on the right side of the frame 91 and locked on a right ear of the observer, and a temple 92b provided on the left side of the frame 91 and locked on a left ear of the observer. The frame 91 includes storage spaces 91s on both side portions, and components such as the various optical elements that constitute the display module 10 described later are accommodated inside the storage spaces 91s. The temples 92a, 92b are foldably coupled to the frame 91 by hinges 95.

The right-eye display module 10a and the left-eye display module 10b differ in that the optical members are disposed symmetrically, but the basic configurations are the same. Accordingly, the right-eye display module 10a and the left-eye display module 10b will be described as the display module 10 without distinction in the description below.

As illustrated in FIG. 2 and FIG. 3, the display module 10 of this exemplary embodiment includes the image light generation device 20, a focusing optical system 25, a first diffraction element 50, a first reflection section 30, a second reflection section 60, and a second diffraction element 70.

The image light generation device 20 is configured to generate image light L0. The focusing optical system 25 is configured to project the image light L0 generated by the image light generation device 20. The first diffraction element 50 includes a first surface 50a and a second surface 50b, and is configured to diffract the image light L0. The first reflection section 30 is configured to reflect the image light L0. The second reflection section 60 is configured to reflect the image light L0 diffracted by the first diffraction element 50 toward the second diffraction element 70. The second diffraction element 70 includes a third surface 70c and is configured to diffract the image light L0 and form an exit pupil G.

The image light generation device 20 is constituted by a display panel such as an organic electroluminescent display panel, for example. In a state in which the observer is wearing the display device 100, the image light generation device 20 is disposed somewhat rearward of an eye E, and is configured to emit the image light L0 frontward. The image light generation device 20 is disposed so that an optical axis L01 of the image light L0 is substantially parallel with the Z-axis.

Note that the image light generation device 20 may include a plurality of display panels corresponding to different colors, and a synthesis optical system configured to synthesize image light of the respective colors emitted from the plurality of display panels. Further, the image light generation device 20 may include an illumination light source and a display panel such as a liquid crystal display element configured to modulate illumination light emitted from the illumination light source. Alternatively, the image light generation device 20 may have a configuration in which laser light is modulated using a micro-mirror device. Alternatively, the image light generation device 20 may be constituted by micro light-emitting diodes (LEDs), micro-electromechanical systems (MEMS) displays, and the like.

The optical axis L01 of the image light L0 is an axis through which passes a central main beam of the image light L0 emitted from a center of a display region of the image light generation device 20. In other words, the optical axis L01 of the image light L0 is an axis along a normal line of an exit surface 20a of the image light generation device 20 of the image light, passing through a center of the exit surface 20a. Further, when the image light generation device 20 is constituted by a laser light source and a mirror configured to scan light from the laser light source, an image plane is formed by the scanning of the laser light, and therefore the optical axis of the image light L0 is an axis that passes through a center of the image plane and is parallel to a normal line of the image plane.

The focusing optical system 25 is an optical system configured to focus the image light L0 generated by the image light generation device 20, and includes a plurality of lenses. In this exemplary embodiment, the focusing optical system 25 is constituted by four lenses 251, 252, 253, 254 provided along the optical axis L01 of the image light L0. However, the number of lenses constituting the focusing optical system 25 is not particularly limited. Furthermore, as the lenses, a configuration in which the plurality of lenses are bonded together, for example, a bonded achromatic lens or the like, may be used. Further, the lenses may be non-spherical lenses, such as free curved lenses, or may be spherical lenses.

The first diffraction element 50 includes a volume hologram of a reflection type. The first diffraction element 50 includes the first surface 50a facing the focusing optical system 25 and the second surface 50b facing the first reflection section 30. The first diffraction element 50 has a recessed curved surface in which the second surface 50b on which the image light L0 is incident is recessed from the first reflection section 30. In other words, the second surface 50b has a shape in which a central portion is recessed and curved relative to a peripheral portion in an incident direction of the image light L0 from the first reflection section 30. Thus, the first diffraction element 50 includes positive power and can efficiently deflect the image light L0 toward the second reflection section 60.

The first diffraction element 50, while a reflection-type diffraction element, is configured so that, with respective refractive indices of a low refractive index portion and a high refractive index portion constituting interference fringes being appropriately set, zero-order diffraction light is transmitted from the first surface 50a to the second surface 50b. The first diffraction element 50 is configured to transmit the image light L0 emitted from the image light generation device 20 from the first surface 50a toward the second surface 50b as zero-order diffraction light, and emit the image light L0 emitted from the first reflection section 30 from the second surface 50b toward the second diffraction element 70 as first-order diffraction light. The interference fringes are described in more detail below.

Note that the first diffraction element 50 need only be a diffraction element of a reflection-type and capable of transmitting zero-order diffraction light, is not limited to a volume hologram, and may be constituted by, for example, a surface relief-type diffraction element, a surface relief holographic element, or the like. Regardless of the configuration, when the image light L0 is incident from a normal line direction of the second surface 50b, the first diffraction element 50 has a property of emitting diffraction light having the highest diffraction efficiency in a specific direction.

Figure 4:
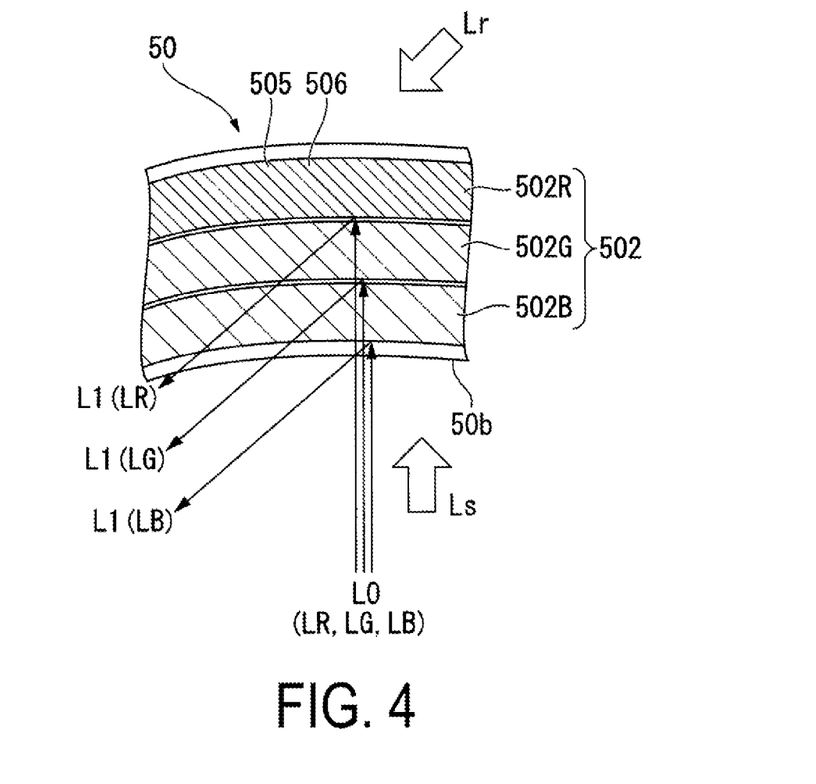
FIG. 4 is an explanatory view of an interference fringe of a volume hologram.

FIG. 3 is an explanatory view of an interference fringe of a volume hologram constituting the first diffraction element 50.

As illustrated in FIG. 4, the volume hologram constituting the first diffraction element 50 is provided with interference fringes 502 having a pitch corresponding to a specific wavelength. The interference fringes 502 have a configuration in which a low refractive index portion 505 having a relatively low refractive index and a high refractive index portion 506 having a relatively high refractive index are alternately provided. Accordingly, the interference fringes 502 are recorded in a hologram photosensitive layer as a refractive index difference of the material constituting the hologram.

The interference fringes are inclined in one direction relative to the second surface 50b of the first diffraction element 50 so as to correspond to a specific incident angle. Thus, the first diffraction element 50 diffracts the image light L0 in a predetermined direction so as to form a predetermined angle relative to the normal line direction of the second surface 50b. The specific wavelength and the specific incident angle correspond to a wavelength and an incident angle of the image light L0. The interference fringes 502 can be formed by performing interference exposure on the holographic photosensitive layer by using reference light Lr and object light Ls.

The image light L0 is light used for color display, including red light LR, green light LG, and blue light LB. Thus, in the first diffraction element 50, the interference fringes 502 are formed at a pitch corresponding to a specific wavelength. For example, interference fringes 502R for red light are formed at a pitch corresponding to a wavelength of 615 nm, for example, in a wavelength range from 580 nm to 700 nm of a red color gamut. Interference fringes 502G for green light are formed at a pitch corresponding to a wavelength of 535 nm, for example, in a wavelength range from 500 nm to 580 nm of a green color gamut. Interference fringes 502B for blue light are formed at a pitch corresponding to a wavelength of 460 nm, for example, in a wavelength range from 400 nm to 500 nm of a blue color gamut.

Note that, while the interference fringes 502 are drawn linearly in FIG. 4, when the image light L0 incident on the first diffraction element 50 is a spherical wave, the spherical wave is used as the object light Ls, for example, during interference exposure. In this case, the plurality of interference fringes 502 are each formed in a curved state in the hologram photosensitive layer. Accordingly, the interference fringes 502 are inclined, in a curved state, in one direction relative to the second surface 50b of the first diffraction element 50. Thus, when the image light L0 composed of a spherical wave having a single wavelength is incident from the normal line direction of the second surface 50b, the first diffraction element 50 emits diffraction light L1 having the highest diffraction efficiency in a specific direction inclined from the normal line direction. When the interference fringes 502 are curved, an inclined direction of the interference fringes 502 is defined as an inclination of a straight line connecting both ends of the interference fringe 502, for example.

As illustrated in FIG. 2 and FIG. 3, the first reflection section 30 is constituted by a total reflection mirror. Specifically, the first reflection section 30 includes a base material and a reflection layer composed of a dielectric multilayer film, a metal film, or the like formed on one surface of the base material. The first reflection section 30 is disposed so that a normal line V1 of a reflection surface 30a and the Z-axis are substantially parallel. The reflection surface 30a is constituted by a free form surface, and thus the first reflection section 30 has positive power.

The second reflection section 60 is constituted by a total reflection mirror. Specifically, the second reflection section 60 includes a base material and a reflection layer composed of a dielectric multilayer film, a metal film, or the like formed on one surface of the base material. The second reflection section 60 is disposed inclined so that an angle formed by a normal line V2 of a reflection surface 60a and the Z-axis is substantially 45°. The reflection surface 60a is constituted by a curved surface, and thus the second reflection section 60 has positive power.

The second diffraction element 70 includes a volume hologram of a reflection type. The second diffraction element 70 includes the third surface 70c facing the eye E of the observer and a fourth surface 70d different from the third surface. The second diffraction element 70 has a recessed curved surface in which the third surface 70c on which the image light L0 is incident is recessed. In other words, the third surface 70c has a shape in which a central portion is recessed and curved relative to a peripheral portion in the incident direction of the image light L0. Thus, the second diffraction element 70 includes positive power and can efficiently deflect the image light L0 toward the exit pupil G. The second diffraction element 70 is disposed inclined so that an end portion 70e on a side close to a nose of the observer is positioned in the −Z direction relative to an end portion 70f on a side far from the nose.

A basic configuration of the volume hologram constituting the second diffraction element 70 is the same as the basic configuration of the volume hologram constituting the first diffraction element 50, and thus detailed description of the volume hologram is omitted. However, the volume hologram constituting the second diffraction element 70 is constituted by a partial reflection-type diffraction optical element configured to reflect a portion of incident light and transmit the other portion. Therefore, the second diffraction element 70 functions as a partially transmissive reflective combiner. Thus, outside light is incident on the eye E of the observer via the second diffraction element 70, and therefore the observer can visually recognize an image in which the image formed by the image light generation device 20 and the background are superimposed onto each other.

Note that the second diffraction element 70 need only be a diffraction element of a reflection-type, is not limited to a volume hologram, and may be, for example, a surface relief-type diffraction element, a surface relief holographic element, or the like. Regardless of the configuration, when the image light L0 is incident from a normal line direction of the third surface 70c, the second diffraction element 70 has a property of emitting diffraction light having the highest diffraction efficiency in a specific direction.

Figure 5:
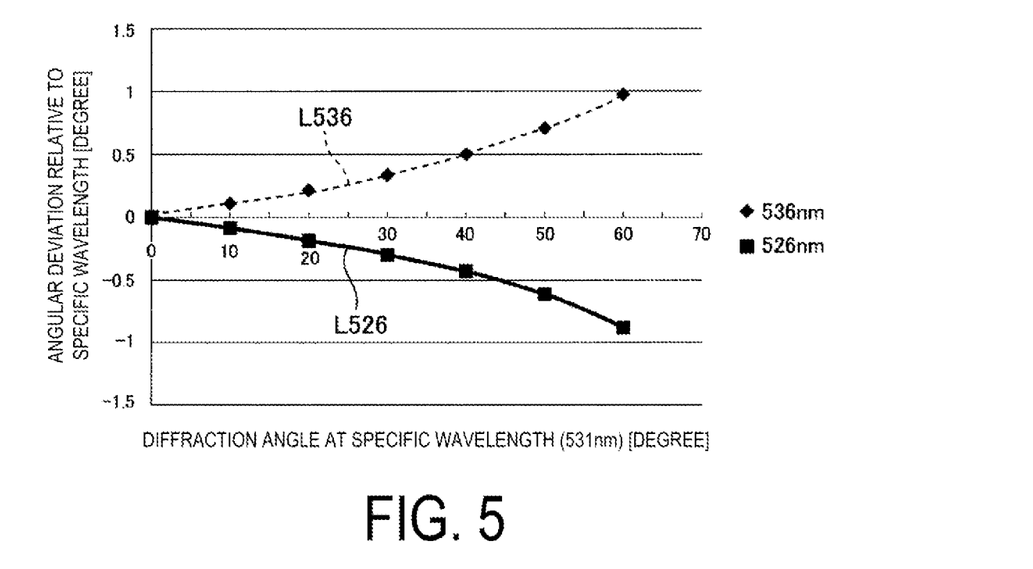
FIG. 5 is a diagram illustrating diffraction characteristics of a first diffraction element and a second diffraction element.

FIG. 5 is a diagram illustrating diffraction characteristics of the first diffraction element 50 and the second diffraction element 70.

FIG. 5 illustrates a difference in diffraction angle between a specific wavelength and a peripheral wavelength when a light beam is incident on one point on the volume hologram. In FIG. 5, given 531 nm as the specific wavelength, a deviation in diffraction angle of light having a peripheral wavelength of 526 nm is indicated by a solid line L526, and a deviation in diffraction angle of light having a peripheral wavelength of 536 nm is indicated by a dashed line L536.

As illustrated in FIG. 5, even when light beams are incident on the same interference fringes recorded in the volume hologram, a light beam having a longer wavelength is diffracted at a larger angle, and a light beam having a shorter wavelength is diffracted at a smaller angle. Therefore, when two diffraction elements composed of the first diffraction element 50 and the second diffraction element 70 are used, an incident angle of light having wavelengths longer than a specific wavelength and an incident angle of light having wavelengths shorter than the specific wavelength must be considered, otherwise aberration cannot be properly compensated. In addition, because the angle of diffraction varies depending on the number of interference fringes, the configuration of the interference fringes must be considered. In the display module 10 of this exemplary embodiment illustrated in FIG. 2, orientations of the first diffraction element 50 and the second diffraction element 70 relative to the image light L0 and the like are made appropriate in accordance with whether the sum of the number of times an intermediate image is formed and the number of times reflection occurs between the first diffraction element 50 and the second diffraction element 70 is an odd number or an even number, making compensation for aberration possible.

Here, assume a virtual plane including a normal line V3 of the second surface 50b of the first diffraction element 50 and a normal line V4 of the third surface 70c of the second diffraction element 70. In the case of this exemplary embodiment, the virtual plane is the paper surface of FIG. 2, and is an XZ plane.

In this exemplary embodiment, the sum of the number of times the image light L0 is reflected and the number of times an intermediate image is generated between the first diffraction element 50 and the first diffraction element 70 is an even number. Therefore, when viewed from a normal line direction of the virtual plane, in the first diffraction element 50 and the second diffraction element 70, when a light beam is incident from the normal line direction of the second surface 50b or the third surface 70c, the direction in which the diffraction light is emitted at the highest diffraction efficiency is set to the same side with respect to the normal line direction of the second surface 50b or the third surface 70c.

More specifically, in this exemplary embodiment, the second reflection section 60 is provided on the optical path of the image light L0 between the first diffraction element 50 and the second diffraction element 70, and therefore the image light L0 is reflected once between the first diffraction element 50 and the second diffraction element 70. Further, because the first diffraction element 50, the first reflection section 30, and the second reflection section 60 each have positive power, one intermediate image Z1 is generated between the second reflection section 60 and the second diffraction element 70. Accordingly, the sum of the number of times the image light L0 is reflected and the number of times an intermediate image is generated between the first diffraction element 50 and the first diffraction element 70 is two, that is, an even number.

Accordingly, given a direction in which the image light L0 is emitted at the highest diffraction efficiency when the image light L0 is incident from the normal line direction of the second surface 50b as a first direction, and a direction in which the image light L0 is emitted at the highest diffraction efficiency when the image light L0 is incident from the normal line direction of the third surface 70c as a second direction, the first diffraction element 50 and the second diffraction element 70 are disposed so that the first direction relative to the normal line direction of the second surface 50b and the second direction relative to the normal line direction of the third surface 70c are positioned on the same side when viewed from the normal line direction of the virtual plane.

More specifically, as illustrated in FIG. 2, when light is incident from a normal line direction K10 relative to the second surface 50b of the first diffraction element 50, a first direction K11 in which diffraction light having the highest diffraction efficiency is emitted is in a position rotated in a clockwise direction CW with respect to the normal line direction K10 of the second surface 50b. Further, when light is incident from a normal line direction K20 relative to the third surface 70c of the second diffraction element 70, a second direction K22 in which diffraction light having the highest diffraction efficiency is emitted is in a position rotated in the clockwise direction CW with respect to the normal line direction K20 of the third surface 70c.

That is, the first direction K11 in which the diffraction light having the highest diffraction efficiency is emitted in the first diffraction element 50 and the second direction K22 in which the diffraction light having the highest diffraction efficiency is emitted in the second diffraction element 70 are positioned on the same side with respect to the normal line direction K10 of the second surface 50b or the normal line direction K20 of the third surface 70c. This configuration is realized by coordinating an inclination direction of the interference fringes of the first diffraction element 50 and an inclination direction of the interference fringes of the second diffraction element 70.

According to this configuration, given a case in which a light beam having an optimum wavelength is incident from the normal line direction K10 of the second surface 50b of the first diffraction element 50 as reference, the diffraction light when a light beam having a wavelength longer than the optimal wavelength is incident inclines in a direction rotated clockwise. Accordingly, when the diffraction light of a light beam having a wavelength longer than the optimal wavelength is incident on the third surface 70c of the second diffraction element 70 via the second reflection section 60, the light beam is incident from a direction rotated further clockwise than the light beam of the optimum wavelength. Therefore, light beams having an optimal wavelength and light beams having a wavelength longer than the optimal wavelength are emitted from the second diffraction element 70 in the same direction. Thus, a reduction in resolution is less likely to occur. Therefore, according to this exemplary embodiment, wavelength compensation can be realized, and deviation of the image when the wavelength of the image light L0 fluctuates can be suppressed small.

A travel path of the image light L0 in the display module 10 of this exemplary embodiment is as follows.

The image light L0 emitted from the image light generation device 20 is incident on the first surface 50a of the first diffraction element 50 via the focusing optical system 25. At this time, a portion of the image light L0 incident on the first surface 50a of the first diffraction element 50 is transmitted through the first diffraction element 50 as zero-order diffraction light without being diffracted, and emitted from the second surface 50b. The image light L0 emitted from the second surface 50b of the first diffraction element 50 is reflected by the first reflection section 30 and is subsequently incident on the second surface 50b of the first diffraction element 50. The image light L0 incident on the second surface 50b of the first diffraction element 50 is diffracted in a predetermined direction by the interference fringes, and emitted from the second surface 50b of the first diffraction element 50. The image light L0 emitted from the second surface 50b of the first diffraction element 50 is reflected by the second reflection section 60 and is subsequently incident on the third surface 70c of the second diffraction element 70. The image light L0 incident on the third surface 70c of the second diffraction element 70 is diffracted in a predetermined direction by the interference fringes and emitted from the third surface 70c of the second diffraction element 70, and the exit pupil G is formed.

In other words, the first diffraction element 50 transmits the image light L0 incident on the first surface 50a from the image light generation device 20 via the focusing optical system 25 as zero-order diffraction light, and emits the image light L0 from the second surface 50b toward the first reflection section 30. The first reflection section 30 reflects the image light L0 emitted from the second surface 50b of the first diffraction element 50 toward the second surface 50b of the first diffraction element 50. The first diffraction element 50 diffracts the image light L0 incident on the second surface 50b from the first reflection section 30, and emits the image light L0 from the second surface 50b toward the second diffraction element 70. The second reflection section 60 reflects the image light L0 diffracted by the first diffraction element 50 toward the second diffraction element 70. The second diffraction element 70 diffracts the image light L0 incident on the third surface 70c from the first diffraction element 50, emits the image light L0 from the third surface 70c, and forms the exit pupil G.

Accordingly, when viewed from the normal line direction of the virtual plane, a portion of the optical path of the image light L0 emitted from the image light generation device 20 and passing through the first diffraction element 50, a portion of the optical path of the image light L0 reflected by the first reflection section 30 and returned to the first diffraction element 50, and a portion of the optical path of the image light L0 that is diffracted by the first diffraction element 50 and travels toward the second reflection section 60 overlap each other.

In general, a diffraction element is often used under conditions in which zero-order diffraction light is decreased to the extent possible, and diffraction light of the first order or greater is increased. In contrast, in the display module 10 of this exemplary embodiment, the zero-order diffraction light transmitted through the first diffraction element 50 is utilized as the image light L0, requiring use under conditions in which zero-order diffraction light is increased to the extent possible. Here, the inventors of the present disclosure conceived that a difference Δn between the refractive index of the low refractive index portion 505 and the refractive index of the high refractive index portion 506 constituting the interference fringes 502 included in the first diffraction element 50 just needs to be made relatively small.

In order to find an optimum refractive index difference Δn to ensure an amount of zero-order diffraction light, the present inventors performed simulations related to transmittance while changing the refractive index difference Δn to various values.

Figure 6:
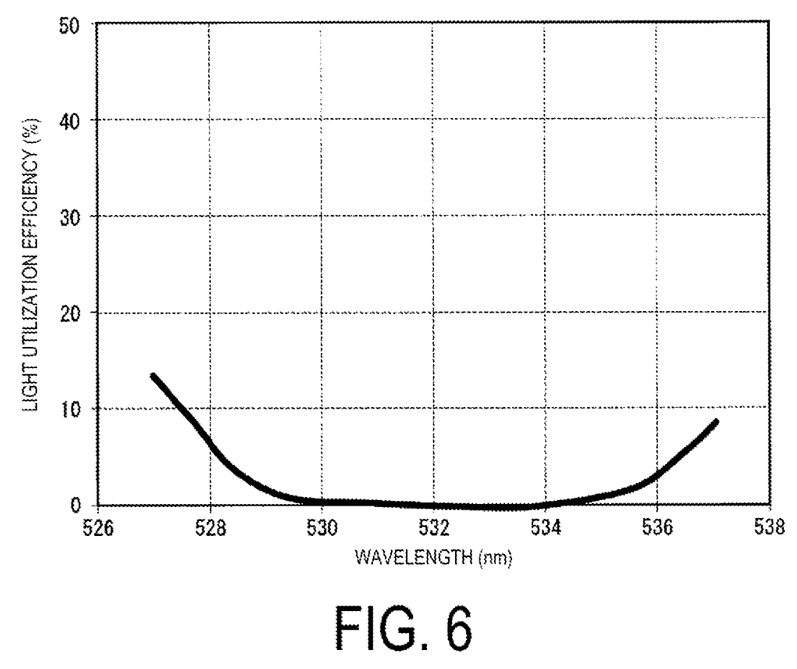
FIG. 6 is a graph showing a relationship between transmittance and wavelength at a refractive index difference $\Delta n$ of 0.035 in the first diffraction element.
Figure 7:
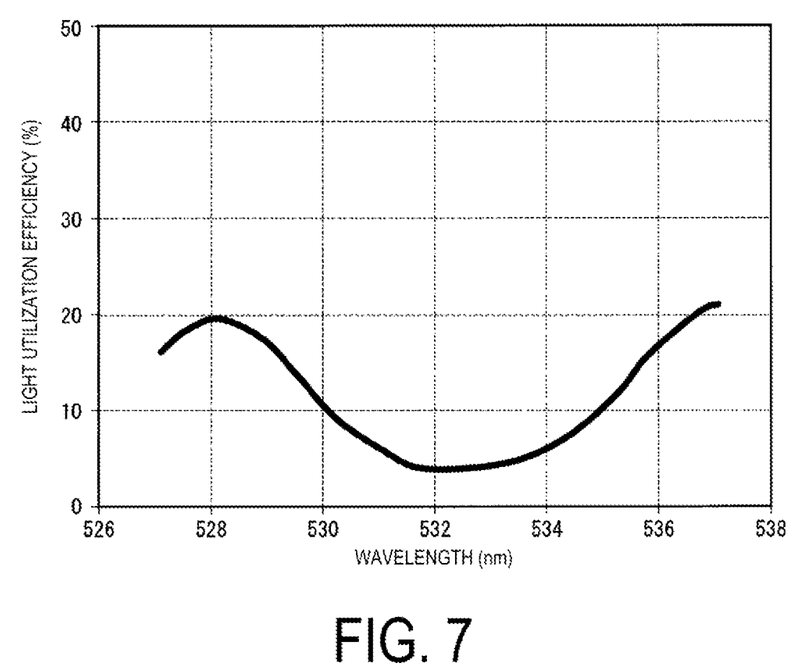
FIG. 7 is a graph showing a relationship between transmittance and wavelength at a refractive index difference $\Delta n$ of 0.019 in the first diffraction element.
Figure 8:
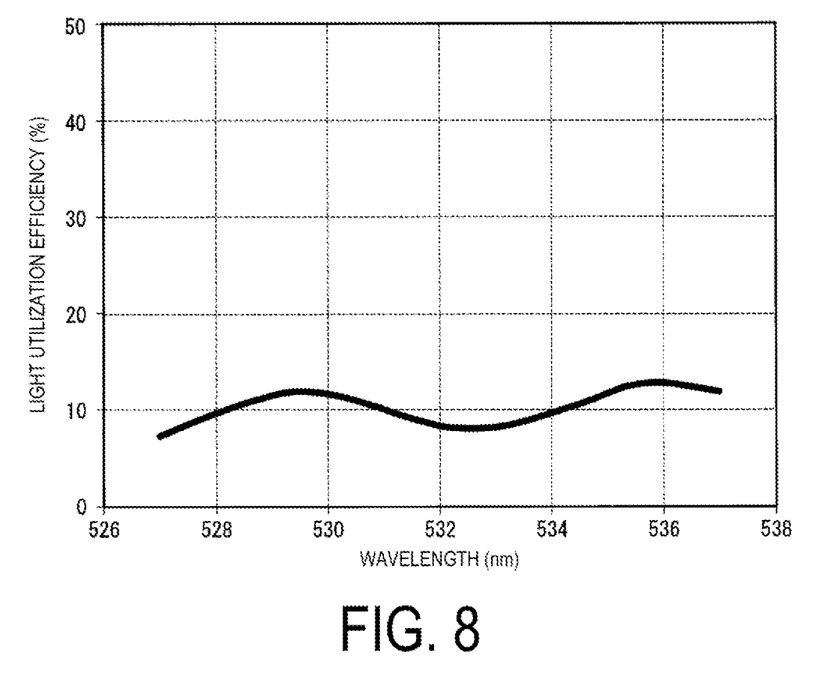
FIG. 8 is a graph showing a relationship between transmittance and wavelength at a refractive index difference $\Delta n$ of 0.010 in the first diffraction element.
Figure 9:
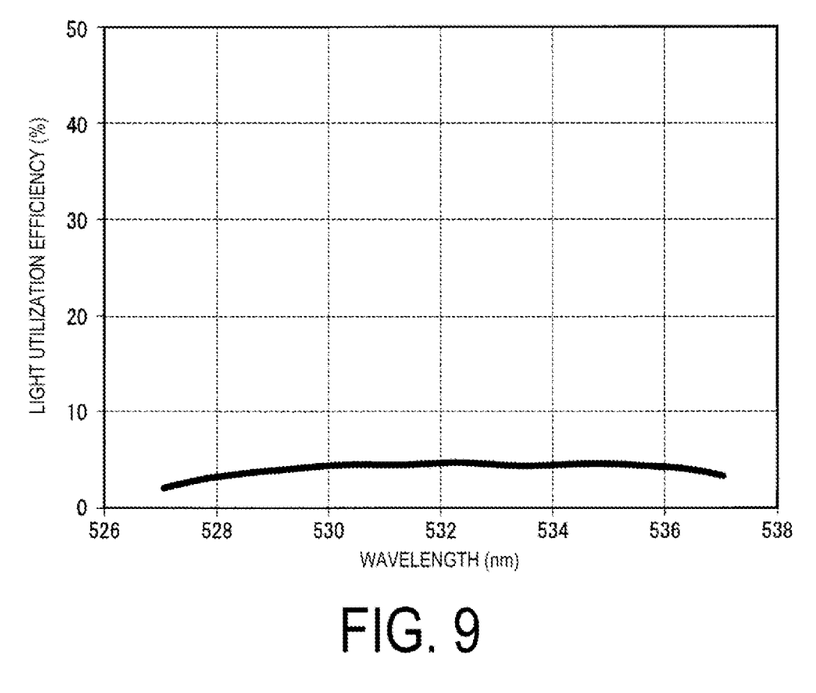
FIG. 9 is a graph showing a relationship between transmittance and wavelength at a refractive index difference $\Delta n$ of 0.005 in the first diffraction element.

FIG. 6 to FIG. 9 are graphs showing a relationship between light utilization efficiency and wavelength at a specific refractive index difference Δn in the first diffraction element 50. FIG. 6 is a graph when the refractive index difference Δn is 0.035. FIG. 7 is a graph when the refractive index difference Δn is 0.019. FIG. 8 is a graph when the refractive index difference Δn is 0.010. FIG. 9 is a graph when the refractive index difference Δn is 0.005.

In FIG. 6 to FIG. 9, the horizontal axis indicates the wavelength (nm) of light incident on the first diffraction element. In this simulation, green light having a wavelength of 532 nm was assumed as the light incident on the first diffraction element. Further, the vertical axis indicates light utilization efficiency (%). Note that the light utilization efficiency in FIG. 6 to FIG. 9 indicates a ratio of an amount of light emitted from the first diffraction element toward the second reflection section to an amount of light incident on the first diffraction element, and is expressed as a product of the transmittance of zero-order diffraction light relative to the amount of light incident on the first surface 50a of the first diffraction element 50, and the reflectance of the diffraction light relative to the amount of light incident on the second surface 50b of the first diffraction element 50. Accordingly, for example, given 50% as the transmittance of zero-order diffraction light and 50% as the reflectance of diffraction light, the light utilization efficiency in FIG. 6 to FIG. 9 is 25%.

As shown in FIG. 6, when the refractive index difference an is 0.035 and the wavelength of incident light deviates from 532 nm, which is a design value, the light utilization efficiency tends to rise. Specifically, when the wavelength of incident light deviates from 532 nm by about ±4 nm, a light utilization efficiency of about 5% is obtained. However, given a wavelength of incident light of 532 nm, which is the design value, the light utilization efficiency is substantially 0%. Therefore, a refractive index difference Δn of 0.035 cannot be adopted.

In contrast, as shown in FIG. 7, when the refractive index difference Δn is 0.019 and the wavelength of incident light deviates from 532 nm, which is the design value, in a manner similar to when the refractive index difference Δn is 0.035, the light utilization efficiency tends to rise. However, the light utilization efficiency when the refractive index difference Δn is 0.019 is generally high compared to the light utilization efficiency when the refractive index difference Δn is 0.035. When the wavelength of incident light is 532 nm, which is the design value, the light utilization efficiency is substantially 5. Accordingly, a refractive index difference Δn of 0.019 can be adopted.

Further, as illustrated in FIG. 8, when the refractive index difference Δn is 0.010 and the wavelength of incident light deviates from 532 nm, which is the design value, the light utilization efficiency fluctuates, but a fluctuation width thereof is small compared to when the refractive index difference Δn is 0.035 or 0.019. Further, the light utilization efficiency when the refractive index difference Δn is 0.010 is even higher compared to the light utilization efficiency when the refractive index difference Δn is 0.019. When the wavelength of incident light is 532 nm, which is the design value, the light utilization efficiency is substantially 8%. Accordingly, a refractive index difference Δn of 0.010 is preferably adopted.

Further, as illustrated in FIG. 9, when the refractive index difference Δn is 0.005, the fluctuation width of the light utilization efficiency associated with the fluctuation in wavelength becomes even smaller compared to when the refractive index difference Δn is 0.010. The light utilization efficiency when the wavelength of incident light is the design value of 532 nm is substantially 5%. Accordingly, a refractive index difference Δn of 0.005 can be adopted.

From the simulation results described above, it was found that, in order to ensure a predetermined light utilization efficiency in the first diffraction element 50, it is desirable that the refractive index difference Δn between the low refractive index portion 505 and the high refractive index portion 506 is less than 0.020 and greater than or equal to 0.005. It is further desirable that the refractive index difference Δn is 0.010. By setting the refractive index difference Δn as described above, it is possible to optimize the utilization efficiency of the image light L0 at a design center wavelength. Note that, in this simulation, the present inventors assumed green light having a wavelength of 532 nm as the light incident on the first diffraction element 50, but hypothesized that substantially the same results can be obtained even when the light incident on the first diffraction element 50 is light of another color.

In the display device of JP-A-2019-133132, the image light traveling from the image light generation device toward the first diffraction element and the image light traveling from the first diffraction element toward the mirror do not overlap each other. Therefore, the image light generation device must be disposed at a position away from a face of the observer, and the device may increase in lateral width and increase in size.

In contrast, according to the display module 10 of this exemplary embodiment, when viewed from the normal line direction of the virtual plane, the optical paths of the image light L0 from the first diffraction element 50 to the second reflection section 60 are folded back twice, and these optical paths overlap each other. Thus, according to the display module 10 of this exemplary embodiment, it is possible to reduce the size of the optical system compared to that of the display device of JP-A-2019-133132.

Further, in the display module 10 of this exemplary embodiment, because the orientations of the first diffraction element 50 and the second diffraction element 70 relative to the incident direction of the image light L0 are appropriately disposed, compensation can be made for color aberration generated by the first diffraction element 50 and the second diffraction element 70. As a result, deviation of the image when the wavelength varies can be suppressed and resolution can be increased.

Further, the display device 100 of this exemplary embodiment is provided with the display module 10 having the advantageous effects described above, and therefore is compact in size and excellent in display quality.

Second Exemplary Embodiment

A second exemplary embodiment according to the present disclosure will be described below with reference to FIG. 10.

A basic configuration of a display module of the second exemplary embodiment is the same as that of the first exemplary embodiment except for the configuration of the first diffraction element and the focusing optical system. Therefore, description of the display module in its entirety is omitted.

Figure 10:
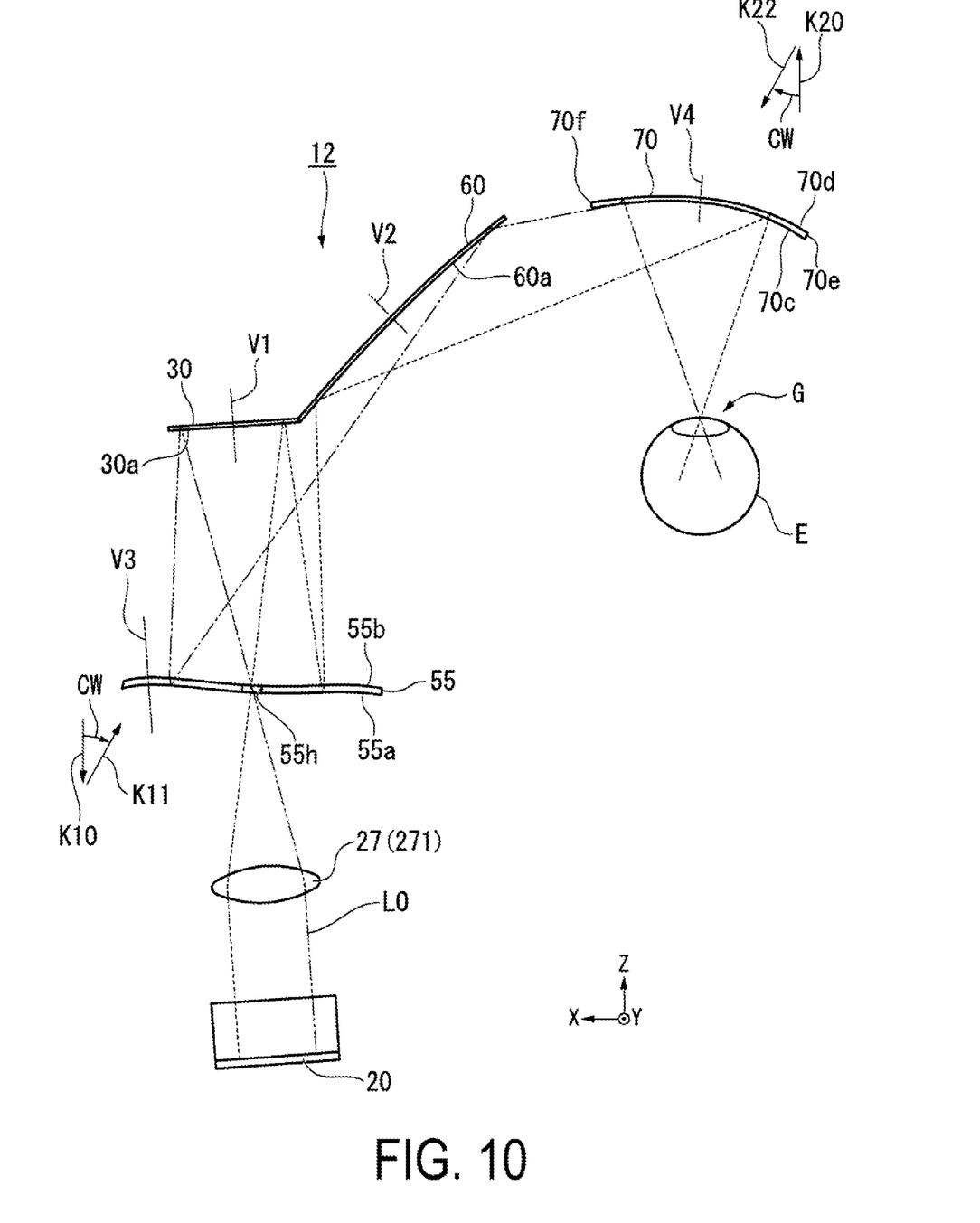
FIG. 10 is a plan view illustrating a configuration of a display module according to a second exemplary embodiment.

FIG. 10 is a plan view illustrating a schematic configuration of the display module of the second exemplary embodiment.

In FIG. 10, the components common to those in FIG. 2 based on the first exemplary embodiment are denoted using the same reference numerals, and descriptions thereof are omitted.

As illustrated in FIG. 10, a display module 12 of this exemplary embodiment includes the image light generation device 20, a focusing optical system 27, a first diffraction element 55, the first reflection section 30, the second reflection section 60, and the second diffraction element 70.

In the case of this exemplary embodiment, the first diffraction element 55 includes a first surface 55a facing the focusing optical system 27 and a second surface 55b facing the first reflection section 30. Further, the first diffraction element 55 includes a light transmission section 55h configured to transmit the image light L0 emitted from the image light generation device 20. The light transmission section 55h can be constituted by a hole provided in the first diffraction element 55, for example. Alternatively, without the interference fringes being provided to a portion of the first diffraction element 55, a region may be formed where only a transparent member is present, and this region may be the light transmission section.

The focusing optical system 27 is configured to focus the image light L0 emitted from the image light generation device 20 onto the light transmission section 55h of the first diffraction element 55. Thus, substantially all of the light beams corresponding to each angle of view of the image light L0 emitted from the image light generation device 20 pass through the light transmission section 55h of the first diffraction element 55. The focusing optical system 27 is constituted by one lens 271. However, the number of lenses 271 constituting the focusing optical system 27 is not particularly limited.

In the display module 12 of this exemplary embodiment, the first diffraction element 55 transmits the image light L0 emitted from the image light generation device 20 through the light transmission section 55h from the first surface 55a toward the second surface 55b, and emits the image light L0 emitted from the first reflection section 30 from the second surface 55b toward the second diffraction element 70 via the second reflection section 60 in a portion other than the light transmission section 55h. Other than this, the configuration of the display module 12 is the same as that of the display module 10 of the first exemplary embodiment.

In this exemplary embodiment as well, the same advantageous effects as those in the first exemplary embodiment can be achieved, i.e., a display module and a display device compact in size and excellent in display quality can be provided.

Note that the technical scope of the present disclosure is not limited to the above-described exemplary embodiments, and various modifications can be made to the above-described exemplary embodiments without departing from the spirit and gist of the present disclosure.

For example, as described above, the first diffraction element is not limited to a volume hologram, and may be constituted by, for example, a surface-relief type diffraction element or the like. However, when the first diffraction element is constituted by a surface-relief diffraction element, in order to ensure the amount of zero-order diffraction light, it is desirable to make a depth of irregularities formed on the surface of the hologram material shallower than that of a typical surface-relief diffraction element.

Further, while the above-described exemplary embodiments illustrate a configuration in which the sum of the number of times the image light is reflected and the number of times an intermediate image is generated between the first diffraction element and the second diffraction element is an even number, the sum of the number of times the image light is reflected and the number of an intermediate image is generated between the first diffraction element and the second diffraction element may be an odd number. For example, a third reflection section may be provided between the second reflection section and the second diffraction element, and the sum described above may be three times. In this case, when viewed from the normal line direction of the virtual plane, the first direction relative to the normal line direction of the first incident surface and the second direction relative to the normal line direction of the second incident surface may be positioned on different sides. Accordingly, for example, one of the first direction relative to the normal line direction of the first incident surface and the second direction relative to the normal line direction of the second incident surface may be positioned in the clockwise direction and the other may be positioned in the counterclockwise direction.

Specifically, while the above-described exemplary embodiments illustrate an example in which the sum of the number of times the image light is reflected and the number of times an intermediate image is generated between the first diffraction element and the second diffraction element is two or three times, the number may be an even number other than two. Further, the sum described above may be zero times, and zero times is included in even numbers. Furthermore, the sum described above may be an odd number other than three.

Furthermore, the specific descriptions of shape, number, arrangement, material, and the like of each component of the display module and the display device are not limited to those of the above-described exemplary embodiments, and can be changed as appropriate.

A display module according to one aspect of the present disclosure may have the following configurations.

(1) The display module according to one aspect of the present disclosure may further include a second reflection section configured to reflect the image light diffracted by the first diffraction element toward the second diffraction element.

(2) In the display module according to one aspect of the present disclosure, the first diffraction element may be configured to transmit the image light emitted from the image light generation device from the first surface toward the second surface as zero-order diffraction light, and emit the image light emitted from the first reflection section from the second surface toward the second diffraction element as first-order diffraction light.

(3) In the display module according to one aspect of the present disclosure, the first diffraction element may be composed of a volume hologram having an interference fringe alternately provided with a low refractive index portion having a relatively low refractive index and a high refractive index portion having a relatively high refractive index, and a difference between a refractive index of the low refractive index portion and a refractive index of the high refractive index portion may be less than 0.020 and greater than or equal to 0.005.

(4) In the display module according to one aspect of the present disclosure, the first diffraction element may include a light transmission section configured to transmit the image light emitted from the image light generation device, and may be configured to transmit the image light emitted from the image light generation device through the light transmission section from the first surface toward the second surface, and emit the image light emitted from the first reflection section from the second surface toward the second diffraction element in a portion other than the light transmission section.

(5) The display module according to one aspect of the present disclosure may further include a focusing optical system configured to focus the image light emitted from the image light generation device onto the light transmission section.

(6) In the display module according to one aspect of the present disclosure, the first diffraction element may be configured to diffract the image light at a diffraction efficiency highest in a first direction when the image light is incident from a normal line direction of the second surface, the second diffraction element may be configured to diffract the image light at a diffraction efficiency highest in a second direction when the image light is incident from a normal line direction of the third surface, and the first diffraction element and the second diffraction element may be disposed so that when a sum of a number of times the image light is reflected and a number of times an intermediate image is generated between the first diffraction element and the second diffraction element is an even number, an orientation of the first direction relative to the normal line direction of the second surface and an orientation of the second direction relative to the normal line direction of the third surface are in a same direction when viewed from a normal line direction of a virtual plane including a normal line of the second surface and a normal line of the third surface and, when the sum is an odd number, the orientation of the first direction relative to the normal line direction of the second surface and the orientation of the second direction relative to the normal line direction of the third surface are in different directions when viewed from the normal line direction of the virtual plane.

What is claimed is:

1. A display module comprising:
    an image light generation device configured to generate image light;
    a first diffraction element including a first surface and a second surface and configured to diffract the image light;
    a first reflection section configured to reflect the image light; and
    a second diffraction element including a third surface and configured to diffract the image light, wherein
    the first diffraction element is configured to transmit the image light incident on the first surface from the image light generation device and emit the image light from the second surface toward the first reflection section,
    the first reflection section is configured to reflect the image light emitted from the first diffraction element toward the second surface of the first diffraction element,
    the first diffraction element is configured to diffract the image light incident on the second surface from the first reflection section and emit the image light from the second surface toward the second diffraction element, and
    the second diffraction element is configured to diffract the image light incident on the third surface from the first diffraction element, and emit the image light from the third surface, thereby forming an exit pupil.

2. The display module according to claim 1, further comprising:
    a second reflection section configured to reflect the image light diffracted by the first diffraction element toward the second diffraction element.

3. The display module according to claim 1, wherein
the first diffraction element is configured to transmit the image light emitted from the image light generation device from the first surface toward the second surface as zero-order diffraction light, and emit the image light emitted from the first reflection section from the second surface toward the second diffraction element as first-order diffraction light.

4. The display module according to claim 3, wherein
the first diffraction element is composed of a volume hologram having an interference fringe including, alternately, a low refractive index portion having a relatively low refractive index and a high refractive index portion having a relatively high refractive index and
a difference between a refractive index of the low refractive index portion and a refractive index of the high refractive index portion is less than 0.020 and greater than or equal to 0.005.

5. The display module according to claim 1, wherein
the first diffraction element includes a light transmission section configured to transmit the image light emitted from the image light generation device, and is configured to transmit, through the light transmission section, the image light emitted from the image light generation device from the first surface toward the second surface, and emit, in a portion other than the light transmission section, the image light emitted from the first reflection section from the second surface toward the second diffraction element.

6. The display module according to claim 5, further comprising:
a focusing optical system configured to focus the image light emitted from the image light generation device onto the light transmission section.

7. The display module according to claim 1, wherein
the first diffraction element is configured to diffract the image light at a diffraction efficiency highest in a first direction when the image light is incident from a normal line direction of the second surface,
the second diffraction element is configured to diffract the image light at a diffraction efficiency highest in a second direction when the image light is incident from a normal line direction of the third surface, and
the first diffraction element and the second diffraction element are disposed so that
when a sum of a number of times the image light is reflected and a number of times an intermediate image is generated between the first diffraction element and the second diffraction element is an even number, an orientation of the first direction relative to the normal line direction of the second surface and an orientation of the second direction relative to the normal line direction of the third surface are in a same direction when viewed from a normal line direction of a virtual plane including a normal line of the second surface and a normal line of the third surface and
when the sum is an odd number, the orientation of the first direction relative to the normal line direction of the second surface and the orientation of the second direction relative to the normal line direction of the third surface are in different directions when viewed from the normal line direction of the virtual plane.

8. A display device comprising:
the display module according to claim 1 and
a housing configured to accommodate the display module.

* * * * *